Aug. 29, 1967        J. R. SQUIRE        3,338,448

DRIP CONTROLLING FITMENT FOR A GLASS BOTTLE

Filed June 6, 1966

INVENTOR.
James R. Squire

BY *Fredrick H. Braun*
ATTORNEY

United States Patent Office 3,338,448
Patented Aug. 29, 1967

3,338,448
DRIP CONTROLLING FITMENT FOR A GLASS
BOTTLE
James R. Squire, Cincinnati, Ohio, assignor to The Procter & Gamble Company, Cincinnati, Ohio, a corporation of Ohio
Filed June 6, 1966, Ser. No. 555,292
3 Claims. (Cl. 215—100.5)

ABSTRACT OF THE DISCLOSURE

A drip controlling fitment surrounds a radial rib formed on a bottle finish. The fitment is a thermoplastic, symmetrical, ring-like member with outwardly-projecting, annular ledges at the top and bottom. The ledges define an annular storage reservoir for catching and retaining droplets from the bottle mouth. The fitment can be inverted on the bottle without altering the drip controlling efficiency.

---

This invention relates to drip controlling fitments for glass bottles and the like. More particularly, the invention relates to a drip controlling fitment which is designed to inhibit dripping of edible oils and like products when poured from glass containers in which such products are normally packaged, shipped or stored.

The problem of preventing drip and surface rundown when pouring edible oil products from glass containers has defined a simple and reliable solution. Numerous devices have been designed to accomplish this objective but most of them have proven to be either ineffective or lacking in commercial acceptability for reasons of cost, fragility, and/or complexity. For these reasons, the provision of a satisfactory drip controlling fitment that is simple, effective and inexpensive has been a long sought improvement in the field of packaging edible oil products.

The principal object of this invention is the provision of a drip controlling fitment for glass bottles containing edible oil products that is reliable in operation and inexpensive to manufacture thereby overcoming the above-stated difficulties.

Another object of the invention is the provision of a drip controlling fitment of the aforesaid character which is so constructed and designed as to provide a reservoir for the storage of droplets that are formed and collected immediately after the pouring from the bottle is discontinued.

A further object of the invention resides in the formation of a structure for a drip controlling fitment whose capacity is not adversely affected because of rubbing contact with the sealing surface or liner of a closure cap used to close the bottle.

Still another object of the invention is the provision of a drip controlling fitment which is so constructed and designed that the residual oil droplets which are stored by the fitment after each usage are drawn off into the stream of flow on subesquent pouring of edible oil from the glass container.

The nature and substance of the invention can be briefly summarized as comprising a drip controlling fitment for a glass bottle having edible oil therein, the bottle having a generally conventional finish, the upper portion of which is modified by the addition of an outwardly projecting annular rib formed integrally with the finish. A plastic drip controlling fitment is provided in the form of an annular ring-like body having a continuous internal channel that snugly engages said annular rib. The fitment structure includes upper and lower cut-off ledges projecting radially outwardly such that an annular reservoir is formed between the ledges to receive and store droplets that are formed after pouring from the bottle and to prevent them from running down the outside surfaces of the bottle.

While the specification concludes with claims particularly pointing out and distinctly claiming the subject matter regarded as forming the present invention, it is believed the invention will be better understood from the following description taken in connection with the accompanying drawing in which:

Figure 1:
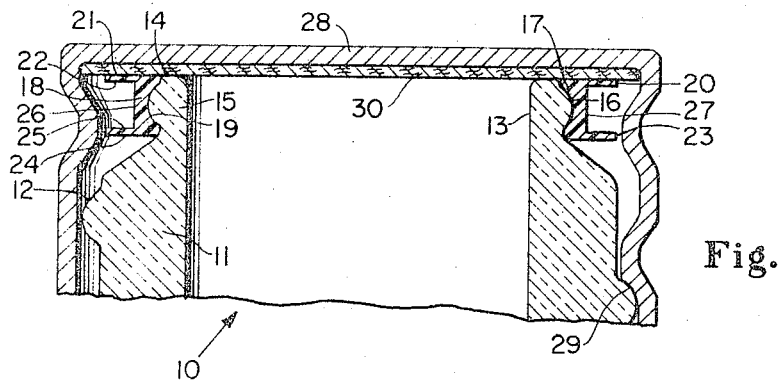
FIGURE 1 is a fragmentary cross section in elevation showing the upper portion of a glass bottle having the drip controlling fitment and a closure cap assembled thereon.
Figure 2:
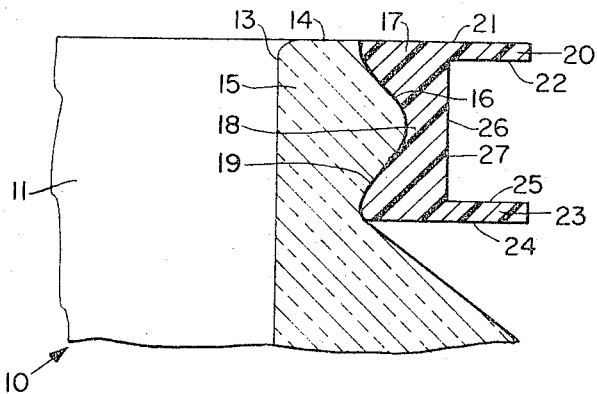
FIGURE 2 is a fragmentary sectional view illustrating the cross section of the drip controlling fitment in larger detail.

Referring now to the drawings and particularly FIGURES 1 and 2 thereof, the drip controlling fitment is shown assembled to a bottle 10 which has only its upper portion shown for purposes of illustration. In the practice of the present invention the bottle 10 is preferably glass since the product therein is an edible oil. Presently known plastic bottle materials are not desirable for storage of edible oil products because the oil can be contaminated with undesirable flavors on prolonged contact with the plastic.

The portion of the bottle 10 shown is the upper end of the finish 11 which is generally conventional and includes a thread 12 and a pouring outlet 13 which functions as a filling and discharge opening. An annular sealing surface 14 in the form of a circular rim is formed at the outer end of the filling and discharge opening 13. The finish 11 as illustrated is modified by the addition of an upwardly projecting annular portion 15 having an outwardly projecting annular rib 16 on the outer surface thereof.

The drip controlling fitment 17 is illustrated in its assembled condition with the bottle 10. The fitment 17 is preferably formed from any well known plastic material having resilient and thermoplastic properties. In particular, polyethylene and like materials that are readily injection molded have been found effective in the fabrication of the drip controlling fitment 17 of the present invention. Plastic materials can be tolerated in making the fitment since it does not remain in prolonged contact with the edible oil and therefore has no detrimental effect on oil flavor.

The general configuration of the fitment 17 is that of an annular ring-like body 18 having a continuous internal channel 19 which is shaped to snugly engage the rib 16 of the bottle 10. The material used in making the fitment 17 is sufficiently resilient to permit assembly over the rib 16 and to allow removal thereof without any permanent distortion or deformation as will be familiar to those skilled in the art.

The structure of the fitment 17 includes an upper cut-off ledge 20 which projects radially outwardly from the body 18. The upper cut-off ledge has its upper surface 21 formed to lie substantially in the plane of the annular sealing surface 14 of the bottle 10. The lower surface 22 projects radially inwardly from the outer periphery of the ledge 20. Similarly, the lower end of the fitment 17 is provided with a lower cut-off ledge 23 which also projects radially outwardly from the body 18. The lower cut-off ledge 23 is defined by the lower surface 24 and the upper surface 25. The surfaces 22 and 25 terminate at their inner ends at the cylindrical surface 26 such that the surfaces 22, 25 and 26 cooperates to form a drip retaining storage channel or annular reservoir 27 between the upper cut-off ledge 20 and the lower cut-off ledge 23.

An examination of FIGURE 2 will show that the cross section of the fitment 17 is symmetrical in design and configuration. While this is not essential, it is preferred since it allows the fitment to be assembled on the rib 16 so that either the surface 21 or the surface 24 is uppermost without affecting drip control performance. It will also be apparent that the outside diameter of the cut-off ledges 20 and 23 is substantially the same in the preferred structure. The symmetrical design of the fitment provides a substantial manufacturing advantage since the fitments can be assembled in production without need for orientation.

FIGURE 1 illustrates the fitment 17 assembled on a bottle on which a conventional closure element has been secured. The closure element may be a metal or plastic cap 28 which is attached by conventonal screw threads 29 which engage the threads 12 of the bottle 10. The closure cap 28 includes a conventional liner 30 which normally bears against the sealing surface 14 to provide a gas tight seal thereby preventing oxidation and deterioration of edible oil products stored in the glass bottle 10.

Figure 3:
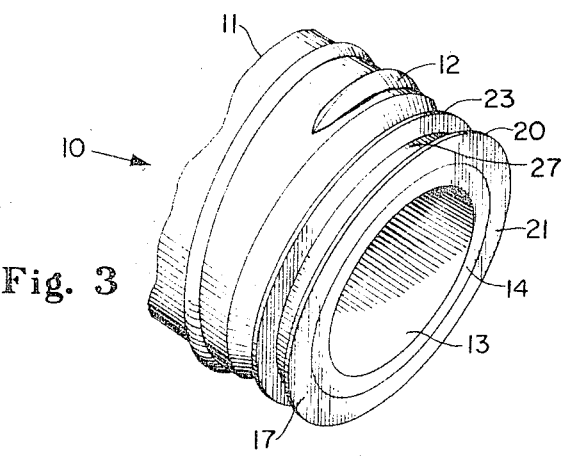
FIGURE 3 is a fragmentary perspective view showing the upper end of the bottle and fitment in pouring attitude.

On removal of the cap 28 the liquid edible oil in the bottle 10 can be poured by tilting the bottle in a conventional way as illustrated in FIGURE 3. The oil will flow through the pouring outlet 13. When the bottle is returned to its upright position, liquid droplets on the sealing surface 14 of the bottle 10 and/or on the surface 21 of the fitment 17 are either returned into the bottle by way of the pouring outlet 13 because of normal surface tension in the liquid or they may remain on the surfaces 14 and 21. Some of the droplets may even run over the edge of the cut-off ledge 20 and flow into the storage reservoir 27. The lower cut-off ledge 23 acts as a secondary drip inhibiting ledge and thus any droplets that flow and cling to the surface 25 will not flow beyond the sharp edge of the lower cut-off ledge 23.

Droplets held and retained in the storage reservoir 27 are not disturbed when the closure cap 28 is reattached to the bottle threads. Droplets remaining on the surfaces 14 and 21 are forced back into the bottle or may be forced over the edge of the ledge 20 into the storage reservoir 27 although a portion of the oil may remain as a thin film between the liner 30 and the surfaces 14 and 21. On the next pouring from the bottle 10, all previously collected droplets are drawn from the storage reservoir 27 into the main stream of flow from the outlet 13 thus leaving the annular reservoir 27 depleted to permit storage of a new group of residual oil droplets that are formed when pouring is again stopped.

The drip inhibiting properties of the ledge 20 may be lessened through repeated contact and rubbing of the surface 21 with the liner 30. Nevertheless, the structure of the fitment is such that its overall drip controlling ability is not noticeably lessened as a result of any drop-off in efficiency of the upper cut-off ledge 20. The majority of oil droplets will be cut off by the ledge 20 when flow is interrupted. However, the provision of the lower cut-off ledge 23 provides a secondary drip controlling surface to retain droplets that flow over the cut-off ledge 20 to the storage reservoir 27. As the surface 21 becomes increasingly contaminated by contact with liner 30 (in the sense that its efficiency as a drip control surface is lessened), the existence of the lower cut-off ledge 23 becomes more important. Additionally, the provision of the drip retaining storage reservoir 27 provides a substantial holding space with relatively large flow control surface area for any droplets that flow over the ledge 20.

The edible oil products as described herein (sometimes referred to as "edible oils") include any liquid edible material which contains a significant amount, i.e., about 30% by weight or greater, of one or a mixture of normally liquid glyceride oils. These edible glyceride oil products includes, for example, cooking oils, salad oils, salad dressings, liquid shortenings, etc.

Glyceride oils suitable for use in the oil products discussed herein are those which can be derived from animal, vegetable or marine sources, including naturally-occurring triglycerides such as cottonseed oil, soybean oil, rapeseed oil, crambe oil, safflower seed oil, sesame seed oil, and sardine oil. Also, suitable liquid glyceride oil fractions can be obtained from palm oil, lard and tallow, as for example, by fractional crystallization or directed interesterification followed by separation of the oil. Oils predominating in glycerides of unsaturated acids may require some hydrogenation to maintain flavor, say to an I.V. of from about 95 to about 115, but care should be taken not to hydrogenate the oil or otherwise process it so that the oil loses its liquid character.

Of course, mixtures of the above oils or other glyceride oils can be used in the edible glyceride oil products, and they can contain additives, such as emulsifiers, antioxidants, etc.

In the use of glass containers with a plastic drip controlling fitment 17 as described for the above edible oil products, it has been found that certain dimensional relationships are preferred with regard to the ledges 20 and 23 and the storage reservoir 27 described heretofore. In particular, it has been found that the width of the ledges (as measured from the surface 26 to the outer periphery of the ledge) should preferably be .060 inch. The thickness of each ledge 20 and 23 is preferably .010 inch. In addition, the preferred perpendicular distance between the surfaces 22 and 25 of the ledges should be about .100 inch.

Drip control of edible oils by the use of the fitment of the present invention can be further improved by coating the pouring and drip controlling surfaces of the fitment (the surfaces 20, 22, 25, 26 and the surface 24 in the event the fitment is inverted) with a fluorochemical material of the type disclosed in the application of Edward A. Fox, Ser. No. 486,522, filed Sept. 10, 1965, and commonly owned by the assignee of the present application. Satisfactory fluorochemical coating materials for this purpose are those available from the Minnesota Mining and Manufacturing Company, St. Paul, Minn., and selected from a group consisting of materials identified by their code numbers L–1632 and L–1656. The particular preferred member of this class is L–1656.

While particular embodiments of the invention have been described and illustrated it will be obvious to those skilled in the art that various changes and modifications can be made without departing from the spirit and scope of the invention and it is intended to cover in the appended claims all such changes and modifications that are within the scope of this invention.

What is claimed as new is:

1. A drip controlling fitment for a glass bottle having an edible oil therein, said bottle having a generally conventional bottle finish including an annular sealing surface at its uppermost end, an outwardly projecting annular radial rib formed externally of said finish below said sealing surface, a drip controlling fitment molded from resilient thermoplastic material and comprising an annular ring-like body having a continuous internal channel snugly engaging said radial rib of said bottle, said fitment having a thin upper cut-off ledge projecting radially outwardly, the upper surface of the upper cut-off ledge being in the plane of said annular sealing surface of said bottle, said fitment having a thin lower cut-off ledge projecting radially outwardly and spaced from said upper cut-off ledge, an annular storage reservoir formed between said upper and lower ledges, said fitment cooperating with said bottle finish to control dripping when pouring of edible oil from said bottle is stopped by catching and retaining oil droplets on the upper surface of the upper cut-off ledge and in the storage reservoir of the fitment to prevent oil droplets from running down the outside surface of said bottle beneath the plane of the fitment, the cross section of said fitment being symmetrical in design and configuration such that the fitment can be inverted on said bottle without having any effect on the drip controlling efficiency of the fitment.

2. A drip controlling fitment as claimed in claim 1 wherein the width of the cut-off ledges measured from the bottom of the storage reservoir is .060 inch, the thickness of each cut-off ledge is .010 inch and the spacing between cut-off ledges is .100 inch.

3. A drip controlling fitment as claimed in claim 1 wherein the pouring and drip controlling surfaces are coated with a fluorochemical material.

References Cited

UNITED STATES PATENTS

| 1,918,117 | 7/1933 | Martin | 222—571 |
| 2,854,163 | 9/1958 | Barnby | 215—31 |

FOREIGN PATENTS

| 1,261,408 | 4/1961 | France. |
| 754,582 | 8/1956 | Great Britain. |

JOSEPH R. LECLAIR, *Primary Examiner.*

DONALD F. NORTON, *Examiner.*